Figure 1:
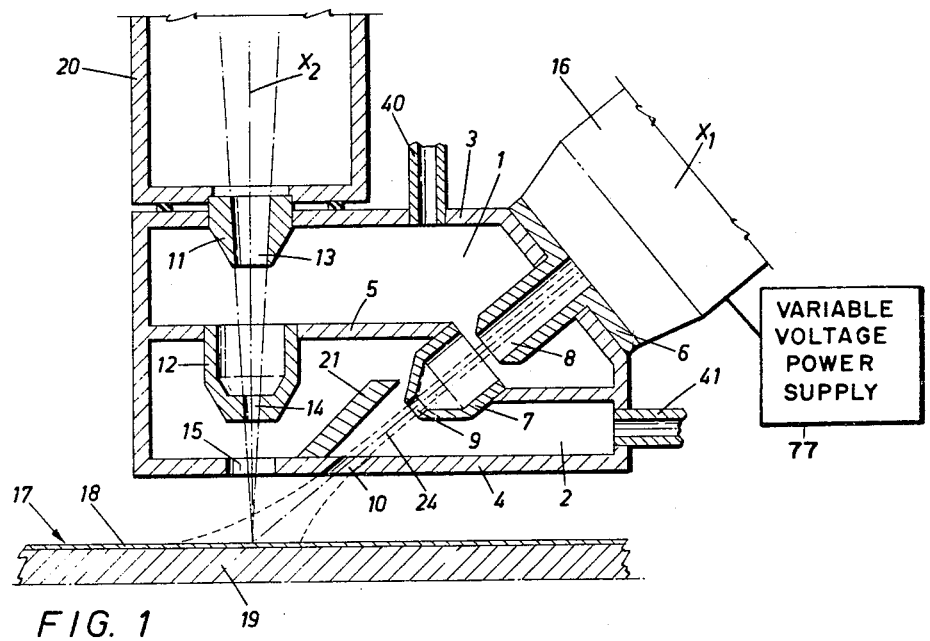

April 2, 1968     W. W. B. SCHUMACHER     3,376,419
METHOD AND APPARATUS FOR DETERMINING THE
THICKNESS OF INTEGUMENTS Filed May 11, 1964     4 Sheets-Sheet 1

Inventor
WILHELM W. B. SCHUMACHER
by:
    Attorney

April 2, 1968    W. W. B. SCHUMACHER    3,376,419
METHOD AND APPARATUS FOR DETERMINING THE
THICKNESS OF INTEGUMENTS
Filed May 11, 1964    4 Sheets-Sheet 2

Inventor
WILHELM W. B. SCHUMACHER
by: *[signature]*
Attorney

April 2, 1968    W. W. B. SCHUMACHER    3,376,419
METHOD AND APPARATUS FOR DETERMINING THE
THICKNESS OF INTEGUMENTS
Filed May 11, 1964    4 Sheets-Sheet 3

Wilhelm W. B. Schumacher
INVENTOR.

BY
Attorney

April 2, 1968     W. W. B. SCHUMACHER     3,376,419
METHOD AND APPARATUS FOR DETERMINING THE
THICKNESS OF INTEGUMENTS
Filed May 11, 1964     4 Sheets-Sheet 4

Wilhelm W. B. Schumacher
INVENTOR.

BY

Attorney

United States Patent Office 3,376,419
Patented Apr. 2, 1968

3,376,419
METHOD AND APPARATUS FOR DETERMINING THE THICKNESS OF INTEGUMENTS
Wilhelm W. B. Schumacher, Don Mills, Ontario, Canada, assignor to Ontario Research Foundation, Toronto, Ontario, Canada
Continuation-in-part of application Ser. No. 146,080, Oct. 16, 1961. This application May 11, 1964, Ser. No. 367,284
28 Claims. (Cl. 250—83.3)

This invention relates to methods and apparatus for determining the thickness of a plate, sheet, wall of a cavity or the like and is a continuation-in-part of application Ser. No. 146,080, filed Oct. 16, 1961 (now abandoned), which, in turn is a continuation-in-part of application Ser. No. 53,791, filed Sept. 2, 1960 (now abandoned), both latter applications being for Method and Apparatus for Determining the Thickness of Integuments. This invention also relates to methods and apparatus for determining the thickness of integuments or coatings. More particularly, in one embodiment thereof, this invention relates to methods and apparatus for determining the thickness of an integument of one chemical composition on a base material of another chemical composition by projecting electrons at the integument, determining the energy of the electron beam at which complete penetration of the integument occurs, and determining the thickness of the integument by relating the energy of the electron beam required to completely penetrate the integument to the range-energy curve or relation of electrons passing through matter. This same basic principle also may be utilized in accordance with another embodiment of this invention to determine the thickness of a sheet, plate or the like or of the wall of a thin walled tube, cavity or the like.

In the past many methods have been proposed for determining the thickness of integuments on base materials. For example, the thickness of integuments has been determined non-destructively by magnetic methods and by methods based on electro-conductivity. These methods, however, depend on certain physical characteristics being different in the integuments and the base materials, and for this reason are useful only in certain cases. For example, in employing magnetic methods, the integument and base material must have completely different magnetic properties. Where electroconductivity methods are used, the integument and base material must have completely different electro-conducting charactertistics.

Chemical methods also have been employed. For example, it is possible to ascertain the thickness of a coating on a base material by dissolving a given area of the coating by suitable etching techniques, separating the dissolved coating from the solution, and determining the amount of coating present. Once the volume of the dissolved coating and the area of the coating which was dissolved are known, thickness may be readily calculated. This method is not only tedious, however, but also destructive.

In view of the disadvantages of the aforementioned methods, considerable effort has been directed to finding a more suitable method for ascertaining the thickness of integuments. One method which has been developed is the X-ray fluorescence method. In this method, which is non-destructive, X-rays are directed against the integument with sufficient energy to penetrate the integument and to cause the base material, on which the integument is coated, to emit characteristic X-rays. These characteristic X-rays usually are of the K type, if the energy of the incident X-rays is sufficiently high, but L X-rays also may be emitted. K as well as L X-rays have a substantially fixed energy and frequency for each of the elements, and hence are characteristic of each element as is well known. It has been found as one would expect, that the intensity of the K X-rays generated in the base material and passed outwardly through the integument is lower the greater is the thickness of the integument. Once this relationship has been plotted for any two materials (integument and base material), it is possible to ascertain the thickness of integuments on base materials in systems having the same chemical compositions for which the graph has been plotted, by measuring the intensity of the characteristic X-rays emitted by the base material and attenuated by the integument and reading the thickness of the integument corresponding to this particular intensity.

While it would appear that the X-ray fluorescence method should be a very acceptable method for the non-destructive determination of the thickness of an integument on a base material, in practise it has been found that this method has numerous disadvantages.

For example, this method is useless in cases where the integument is an alloy and the base material is composed of one of the materials making up the alloy. Suppose, for example, that the integument is an alloy of nickel and iron and the base material is iron. Characteristic X-rays will be generated both by the iron in the integument and the base material, and it is not possible to ascertain the origin of these X-rays. Hence, it is not possible to determine the thickness of the integument, because the intensity of the characteristic X-rays generated by the base material is unknown.

This method also is not applicable to the determination of the thickness of minute areas of integument, for example, a circle having a diameter of about 0.2 mm. The reason for this is the fact that even with very thin coatings, the attenuation of the characteristic X-rays of the base material by the coating is in most cases high, therefore requiring a high intensity incident radiation. Any attempt to reduce the area on the integument on which the X-rays impinge by means of an apertured plate results in a decrease in the intensity of the incident radiation. Thus, since only relatively large areas on the integument on which radiation of sufficient intensity can impinge can be employed, the measured thickness as a result of this method can only be considered to be an average over a relatively large area. Even then this method also has the disadvantage of being quite slow.

Another major disadvantage of the X-ray fluorescence method is that it requires an intensity-thickness curve for every combination of coating material and base material.

The same disadvantages are present if, instead of a primary X-ray beam, beta-rays from radium or any other beta-emitting radioactive isotope are being used to excite the characteristic K or L X-rays of integument and base as shown by Reiffel in U.S. Patent No. 2,928,944 issued Mar. 15, 1960. Unless the chemical composition of base and integument are fully known, and calibration curves for the system taken, it can not be decided where the measured X-rays come from, and one obtains a chemical analysis rather than a thickness measurement.

It will be noted that while Reiffel states that his apparatus can be used to determine the thickness of platings, in fact he fails to disclose how this may be effected. It must be presumed, therefore, that Reiffel contemplates the use of his apparatus in the same way as apparatus for determining thickness by the X-ray fluorescence method previously discussed. In any event, the apparatus disclosed by Reiffel cannot, without modification, be used in practising my invention because beta-rays or other rays emitted from radioactive isotope sources are of a fixed energy, and no provision is made to permit the energy of the beta particles emitted from the source to be varied.

Accordingly, it is one object of my invention to provide methods and apparatus for determining the thickness of integuments which obviate the aforementioned disadvantages of the prior art methods and apparatus referred to previously.

In particular it is one object of my invention to provide such a method and apparatus which is non-destructive of the integument being tested or the base material on which the integument rests.

It is another object of my invention to provide such method and apparatus as can be advantageously employed even if there are no differences in the physical properties, such as ability to be magnetized and electro-conductivity, of the integument and base material.

A further object of my invention is to provide such a method and apparatus whose operability to produce the desired results depends only on a difference in chemical composition between the integument and base material, although the complete composition may be unknown.

Still another object of my invention is to provide a method and apparatus for determining the thickness of integuments, even when the integument contains as a part thereof the same material as the base material.

Yet another object of my invention is to provide a method and apparatus for determining the thickness of an integument of any chemical composition on a base material of any other chemical composition.

A further object of my invention is to provide a method and apparatus for determining the thickness of a smaller area of integument than has hitherto been practically possible.

Still another object of my invention is to provide such a method and apparatus that provides results quickly.

Another object of my invention is to provide a novel method and apparatus for determining the thickness of the walls of cavities, thin tubes, plates, sheets or the like.

In brief, in accordance with the one embodiment of my invention for determining the thickness of an integument on a base material utilizing the known relationship between range and energy of electrons passing through matter, the integument and the base material having different chemical compositions, an electron beam is directed at the integument and the kinetic energy of the electron beam is varied. The kinetic energy of the electron beam at which complete penetration of the integument occurs is determined. The thickness of the integument is determined by relating the kinetic energy of the electron beam at which complete penetration of the integument occurs to the range-energy curve of electrons passing through matter.

The same principle as aforementioned may be utilized in accordance with this invention to determine the wall thickness of cavities, thin-walled tubes, plates or the like.

In practising my invention there are numerous ways in order to determine the energy of the electron beam required for complete penetration of the integument or the wall or sheet, and some of these ways will be outlined in detail hereinafter.

It also should be noted that while various types of electromagnetic radiation such as X-rays and light may be used in practising my invention, they will only be used in a secondary manner to provide a signal for the electron penetration depth as will become more apparent hereinafter.

Figure 2:
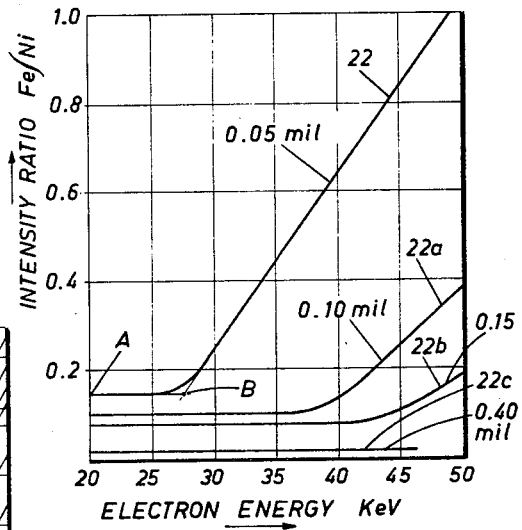
Figure 3:
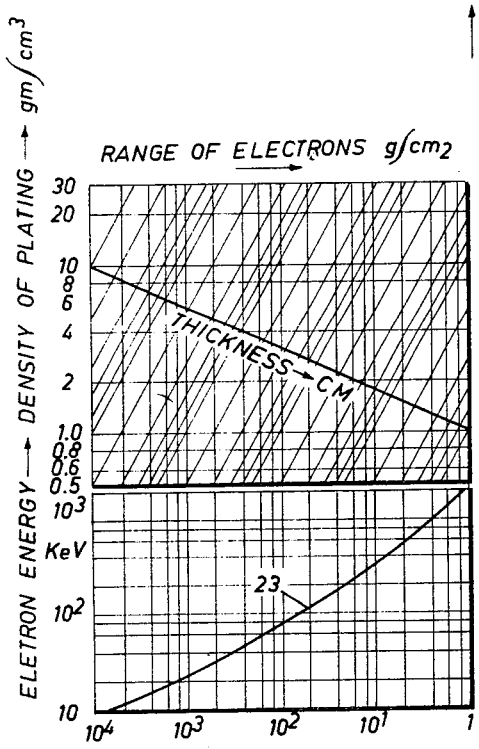
Figure 4:
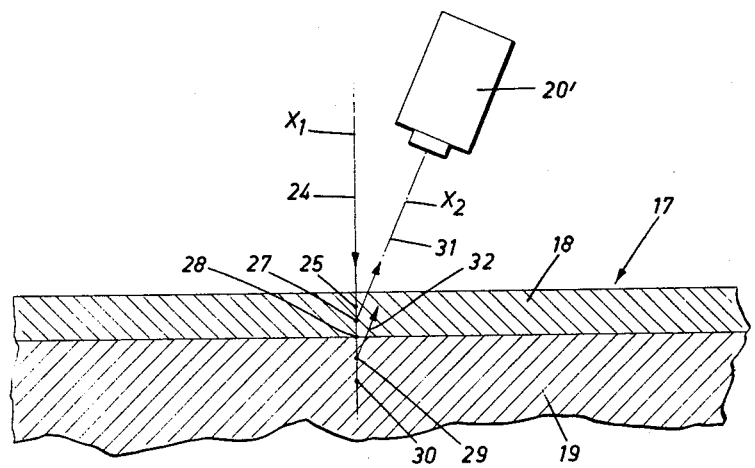
Figure 5:
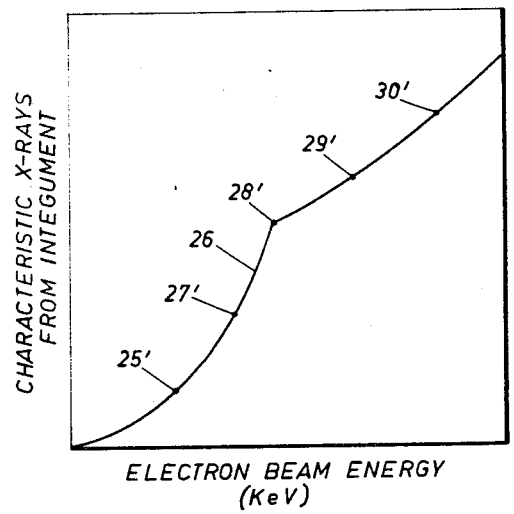

Other objects and advantages of my invention will become apparent from the following disclosure taken in conjunction with the drawings, in which:

FIGURE 1 is a schematic representation, in section, of a part of apparatus useful in practising my invention, FIGURE 2 is a graph showing the intensity ratios of the characteristic K X-rays of iron and nickel plotted against electron beam energy, the graph having been obtained by practising my invention, FIGURE 3 shows a pair of graphs, one relating density of plating to thickness of plating, and the other and lower graph being the universal range-energy curve of electrons passing through matter, FIGURE 4 schematically illustrates another embodiment of my invention, FIGURE 5 is a graph showing intensity of the characteristic K X-rays of a thin integument plotted against electron beam energy, and FIGURES 6, 7, 8 and 9 schematically illustrate various types of apparatus which may be used for determining the thickness of a sheet or the wall thickness of a cavity, tube or the like.

It will be appreciated that while, in FIGURE 1, I have shown apparatus useful in practising my invention, many other types of apparatus may be used. Apparatus embodying my invention may include means for producing an electron beam of variable energy, such as an electron gun located in a vacuum chamber, a pressure stage stretch being provided between the electron gun and the atmosphere, means for varying the electron energy of the electron beam, and means for detecting and indicating the intensity of characteristic X-rays generated from at least the integument. The specimen to be irradiated is placed in the atmosphere in line with the electron beam, but may also be placed in a vacuum or in a protective gas atmosphere such as argon.

Referring to FIGURE 1, one embodiment of suitable apparatus for practising my invention is shown and consists of a pair of vacuum chambers 1 and 2 defined by walls 3 and 4 and separated by a wall 5. Inserts 6 and 7 having apertures 8 and 9 therein respectively are provided in walls 3 and 5 respectively and are aligned with one another and with an aperture 10 in wall 4. Inserts 11 and 12 having apertures 13 and 14 therein respectively are provided in walls 3 and 5 respectively. Apertures 13 and 14 are aligned with an aperture 15 in wall 4.

A vacuum chamber 16 houses an electron gun (not shown) of any conventional type which is adapted to fire a beam of electrons 24 along the axis $X_1$ and out into the atmosphere through aperture 10.

A specimen 17 to be irradiated comprises an integument 18 on a base material 19, the integument and base material having different chemical compositions. In the figure the electron beam 24 from the electron gun strikes integument 18 at an angle of 45°.

Means are provided to permit variation of the kinetic energy of the incident electron beam 24. These means, for example, may consist of a variable voltage power supply 77 that comprises a DC power supply connected to the electron gun and adapted to be varied continuously from a low value of, say, a few kilovolts, to a high value of, say, 200 kilovolts.

An X-ray spectrometer 20 of any well known design is provided. In one embodiment of my invention X-ray spectrometer 20 is provided with a selective X-ray intensity measuring device and recorder with at least one channel, the measuring device and recorder being adapted to measure and record the intensity of a characteristic X-ray of integument 18. In another embodiment of my invention the X-ray intensity measuring device and recorder has at least two channels and is adapted to separately measure and record the intensities of characteristic X-rays from both integument 18 and base 19. Such equipment is well known in the art and needs no further elaboration here.

A shield 21 prevents electrons which are scattered in vacuum chamber 2 from entering aperture 14. Shield 21 also guards against the entry into aperture 14 of secondary X-rays which may be generated as a result of electrons striking the edges of aperture 10. Aperture 10 will define a narrow beam of electrons, but in the practice of my invention a precisely focused electron beam is not required.

While the electron beam 24 incident on integument 18 covers a relatively large area, because of the inevitable scattering of the beam (this area may be from 0.5 to 3 mm. in diameter in practice), the area from which X-rays are observed may have a diameter of about 0.2 mm. The size of this latter area is determined by the diameter of apertures 13, 14 and 15, the distance they are spaced apart, and the distance between aperture 15 and integument 18. Thus in accordance with my invention observation is permitted of a "microspot" on integument 18.

The vacuum chamber 16 containing the electron gun is provided with a vacuum pump (not shown) connected thereto. Vacuum pumps (not shown) are connected to chambers 1 and 2 by pipes 40 and 41 respectively.

One pressure stage stretch is defined by apertures 8, 9 and 10. Another pressure stage stretch is defined by apertures 13, 14 and 15. Pressure stage stretches per se are known. Atmospheric air entering apertures 10 and 15 is continuously pumped off keeping the pressure in chambers 1 and 2 in equilibrium, and lower than atmospheric pressure.

Means may be provided to permit shifting of the axis $X_2$ of spectrometer 20. Reference is made to such means in my copending application Ser. No. 802,543, filed Mar. 29, 1959 for Means and Method for X-Ray Spectrometry (issued July 4, 1961 as U.S. Patent No. 2,991,362), the teachings of which are incorporated herein by reference.

In explaining the operation of the apparatus shown in FIGURE 1, and in describing a method of my invention, it will be assumed for the sake of simplicity that integument 18 is of nickel and base material 19 is iron.

Electrons are directed from the electron gun in chamber 16 against integument 18 with sufficient energy to cause characteristic K X-rays of nickel to be generated. The energy of the electron beam is controlled, however, for example by means of the variable D.C. power supply, so that the energy of the electron beam is insufficient to cause the beam to completely penetrate integument 18. The X-ray spectrometer is set to measure separately the intensities of the K X-rays from nickel and iron respectively. Electronic apparatus known in the art may be employed to indicate and record the ratio of the intensities of the iron K X-rays and the nickel K X-rays. The initial magnitude of this ratio will be somewhere on the horizontal part of the curves shown in FIGURE 2. For example, if integument 18 is 0.05 mil thick, as will be assumed hereinafter, and the electron energy of the beam is 20 kev., the intensity ratio will be at point A. The energy of the electron beam is increased and a continuous plot of the intensity ratio is made. At a certain electron beam energy an irregularity will occur in the curve. This irregularity in the case of curve 22 occurs at point B. Point B is most important as it shows where complete penetration of integument 18 occurred and direct excitation of base material 19, began, and it is not dependent on instrument performance. Point B is best determined by continuing to increase the electron beam energy, after the irregularity has occurred, so as to obtain another substantially straight line, the inclined upper portion of line 22, and projecting this upper and the lower straight section to intersect one another. The energy of the electron beam at point B is 27 kev. from the graph, and this represents the electron beam energy required to penetrate integument 18 at a 45° angle and to excite characteristic iron K X-rays in base material 19. It is known that 6.4 kev. is required to excite iron K X-rays. Hence, the difference between the electron energy necessary to excite K X-rays in base material 19 and the electron energy at point B, i.e. 27−6.4=20.6 kev., represents the electron beam energy required to completely penetrate integument 18 at 45°. Thus, in accordance with this method, the electron energy required to completely penetrate integument 18 is determined from the excitation energy required to excite characteristic X-rays in base material 19 and by observing changes in the ratio of the intensity of the chosen characteristic X-rays of the base and the chosen characteristic X-rays of the integument.

For all practical purposes the range-energy curve of electrons passing through any matter is shown in the lower graph in FIGURE 3. In order to determine the thickness of integument 18 along a 45° angle to its surface in terms of grams/cm.$^2$, the electron beam energy required to completely penetrate integument 18, i.e. 20.4 kev. is related to the range-energy curve 23 (FIGURE 3) of electrons passing through matter. In other words, the point of intersection of line 23 with a horizontal line through the electron beam energy required to completely penetrate integument 18 defines a point, directly below which may be read, on the range of electrons scale, the thickness of integument 18 in terms of grams/cm.$^2$. In many cases it will be sufficient to leave the thickness in grams/cm.$^2$. However, if thickness in a linear dimension is desired, it may be derived from the density-thickness curve shown in the upper graph in FIGURE 3.

Curves 22a, 22b and 22c (FIGURE 2) are for integument thickness of 0.1, 0.15 and 0.4 mil respectively. It will be seen from these curves, and as would be expected, that higher electron beam energizes are required to penetrate thicker integuments 18.

The reason that the initial horizontal parts of curves 22–22c inclusive have finite values of intensity ratios is that K X-rays from nickel can excite K X-rays from iron. However, since the fluorescence radiation in iron is proportional to the primary nickel radiation, for a given thickness to integument 18 the ratio of intensities $I_{Fe}/I_{Ni}$ is constant, as shown. On the other hand, the absorption is less in a thinner nickel layer. Therefore, the initial ratio $I_{Fe}/I_{Ni}$ is higher for thinner integuments 18, as clearly shown in FIGURE 2.

From a consideration of the foregoing, it will be seen that in practising one method embodying my invention, a beam of electrons is directed at integument 18 with sufficient energy to cause characteristic K X-rays of one wavelength to be radiated, but with insufficient energy to cause the electron beam to completely penetrate integument 18. X-rays also may be radiated by base material 19 at this time, and these X-rays are of a different wavelength than the X-rays radiated by integument 18. Spectrometer 20 is set to measure separately the intensities of the characteristic X-rays from integument 18 and base material 19. The ratio of these intensities is observed and plotted against electron beam energy. The energy of the electron beam is increased, and the measurement of intensities and the plotting of intensity ratios is continued, at least until an irregularity occurs in the curve. This irregularity may be determined in the aforementioned manner and represents the electron beam energy required to penetrate integument 18 and directly excite characteristic K X-rays in base material 19. The electron beam energy required to completely penetrate integument 18 is determined from the electron beam energy at this irregularity and the energy required to excite characteristic K X-rays in the base material, by subtracting the two. The thickness of integument 18 then is determined by relating the electron beam energy required to completely penetrate integument 18 to the range-energy curve of electrons passing through matter. This gives the thickness of integument 18 in grams/cm.$^2$. The thickness in centimeters may be derived by multiplying this value by the reciprocal of the density of integument 18. This linear value of thickness is measured along the path of the electron beam (in this case at 45° to the surface of integument 18). The thickness of integument 18 perpendicular to its surface may be readily derived by trigonometry.

It will be apparent from a consideration of the foregoing that my method is practical even when integument 18 contains as a constituent thereof the same material as base material 19, for example, a nickel iron alloy integument on iron, provided that the characteristic electromagnetic radiation of the base which is observed is obtainable in higher yield from the base, than from the integument, and the characteristic electromagnetic radiation of the integument which is observed is obtainable in higher yield from the integument than from the base. It is believed that this method of determining the point of complete penetration of the integument by the electron beam would be suitable from a practical point of view for integuments having up to about 75% or more of their composition of the same material as forms the base. While characteristic X-rays from the identical constituent in both integument 18 and base material 19 will be measured by spectrometer 20, the only effect of this will be to shift a curve such as 22 in FIGURE 2 to a higher position. The position of point B will not shift to the right in FIGURE 2, B will only shift upwardly. Hence the electron beam energy value at point B remains constant. While this method theoretically could be used with integuments having 98% or more, say, of their composition of the same material as forms the base, there are obvious practical difficulties involved in separating the characteristic electromagnetic radiation which is common to the base and integument, since the electromagnetic radiation from the base is derivable in only slightly higher yield than the same electromagnetic radiation derivable from the component of integument common to the base. Improved instrumentation undoubtedly will solve this problem.

My invention also is applicable to the measurement of an integument 18 which is of a material which either completely absorbs characteristic X-rays of base material 19 or attenuates them to such a degree that they can not be measured. An example of such a specimen 17 is an integument 18 of hard chromium on aluminum, such as may be found in the case of internal combustion engines. In such a system, any other than a very thin chromium layer either completely absorbs the characteristic X-rays of aluminum or attenuates them to such a degree that they cannot be measured.

In FIGURE 4 I have shown a specimen 17 having an integument 18 of hard chromium on a base material 19 of aluminum.

In order to ascertain the thickness of integument 18, an electron beam 24 is directed against integument 18 with sufficient energy to cause characteristic K X-rays of chromium, the integument, to be emitted, but with insufficient energy to cause complete penetration of integument 18. Electron beam 24 may travel into integument 18 to a depth 25, for example. An X-ray spectrometer 20' is set to measure and record the intensity of the characteristic K X-rays of chromium. The intensity at point 25 is plotted at point 25' on a curve 26 of a graph showing the intensity of characteristic K X-rays of the integument plotted against electron beam energy. Again, of course, the electron beam energy is measured by conventional means. The energy of electron beam 24 is increased sufficiently to cause penetration of integument 18 and the intensities at various points 27, 28, 29 and 30, for example, are measured and recorded by spectrometer 20' and plotted against the corresponding electron beam energies at 27', 28', 29', and 30' respectively. Sufficient measurement are made to well define curve 26.

As will be seen from FIGURE 4, the characteristic K X-rays 31 of chromium are observed as shown along axis $X_2$ of spectrometer 20'. The characteristic K X-rays 32 of aluminum are absorbed by the chromium and do not penetrate integument 18.

A study of curve 26 will indicate an irregularity at point 28'. This is the point at which complete penetration of integument 18 occurs, because after complete penetration the intensity of the characteristic K X-rays of chromium will not increase as rapidly as prior to complete penetration. Hence, the energy of the electron beam at 28' is the energy required for complete penetration of integument 18. The range of electrons for this particular energy may be found from the universal range-energy curve of electrons passing through matter (FIGURE 3), and thus the thickness of integument 18 is determined.

In this case it will be noted that spectrometer 20' need be provided with only one channel for measurement of the characteristic X-rays radiated from integument 18, as the intensity of the characteristic X-rays from base material 19 is not measured.

Thus, in practising another method embodying my invention for determining the thickness of an integument on a base material, the integument and base material having different chemical compositions, an electron beam is directed against the integument with sufficient energy to cause the integument to emit characteristic X-rays, but with insufficient energy to cause the electron beam to completely penetrate the integument. The energy of the electron beam is increased to cause complete penetration of the integument. The energy of the electron beam at which complete penetration occurs is obtained at point 28' by observing the intensity changes of a characteristic X-ray line, e.g. the K alpha, K beta, L alpha or L beta line of the integument as the energy of the electron beam is increased. The thickness of the integument is determined by relating the energy required for complete penetration of the integument to the range-energy curve of electrons passing through matter.

It will be apparent from a consideration of the foregoing that this method also is applicable in cases where the integument contains, as part of its composition, the same material as the base material, provided that the characteristic electromagnetic radiation of the integument which is observed is obtainable in higher yield from the integument than from the base. In the case of a nickel-iron integument on iron, this condition would best be satisfied by observing characteristic electromagnetic radiation of nickel, since this radiation is derivable from only the integument.

It also will be appreciated that this latter method may be employed in the case where the integument does permit characteristic X-rays emitted from the base to pass therethrough and be measured, e.g. a nickel plating on iron.

It should be noted that the methods hereinbefore described can be used in the case where the base is an alloy containing, as a component thereof, material which forms the integument, e.g. an iron integument on a nickel-iron alloy, provided that, in accordance with the first method (measuring the ratio of the intensities of characteristic electromagnetic radiation from both the base and integument), the characteristic electromagnetic radiation of the base material is derivable with higher yield from the base material than from the integument and the characteristic electromagnetic radiation of the integument is derivable with higher yield from the integument than from the base and, in the case of the second method (observing the intensity changes of characteristic electromagnetic radiation of the integument), the characteristic electromagnetic radiation of the integument is derivable with higher yield from the integument than from the base. Thus, these methods would be successful if there were a low percentage of iron in the base, but would become less accurate as the percentage of iron in the base increased, above say 75% because of the difficulty in separating X-rays from the iron in the base and integument from each other. Again, as aforementioned, this is simply a problem of instrumentation.

In accordance with my invention there is no lower limit to the thickness range that can be measured. Since the smallest detectable amount of an element is in the order of $10^{-10}$ g., it is possible that my method may be applicable down to a point where uniform layers cease to exist.

Since my method permits measurement on a "microspot," it permits the determination of the thickness of integuments on complex shapes, this having hitherto been impossible without a great deal of work, and hence considerable time and expense.

In accordance with my invention it is also possible to determine the thickness of a plurality of integuments, one on top of the other, as long as the total thickness is within the penetration range of the electron beam. For example, with an iron base plated with copper and followed by nickel and chromium platings, the intensity ratios of the X-ray lines of Ni/Cr, Cu/Ni and Fe/Cu can be determined in a single measurement, from which the thicknesses follow. While in the claims appended hereto I have used the term "base material," it is to be understood that this term covers another integument.

While my invention has been described in connection with the measurement of metal integuments on a metal base material, my methods may be applied to any integument on any base material, as long as there is a difference in chemical composition between the integument and base material. For example my invention is applicable to the thickness determination of any layered structures, inorganic or organic e.g. ceramic enamels, lacquers or natural integuments.

Using apparatus such as is shown in FIGURE 1, intensity ratios of iron (base material) K X-rays and nickel (integument) K X-rays were measured for nominal plating thicknesses of 0.05, 0.10, 0.15 and 0.40 mil (1.3, 2.5, 3.8 and 10.0 × 10$^{-3}$ mm. respectively). Integument thickness was calculated from the plating time and current. The integuments showed no holes under a microscope. Each of the specimens was irradiated by an electron gun with the electron energy varied between 20 and 50 kev., using a beam current of 30 microamps at each voltage. The spectrometer was set at the nickel K X-ray and iron K X-ray lines, and the time for a predetermined number of counts from a Geiger-counter was measured. The resulting curves are shown in FIGURE 2. The following table indicates the results obtained with laboratory equipment:

CALCULATED VALUES

| | Normal thickness, mils | Thickness to be penetrated by the electron beam, mils | Energy* required for penetration, kev. | Energy for Excitation of the base line, kev. | Energy for breaking point B of ratio curve |
|---|---|---|---|---|---|
| 1 | 0.05 | 0.071 | 20.0 | 6.4 | 26.4 |
| 2 | 0.10 | 0.141 | 30.5 | 6.4 | 36.9 |
| 3 | 0.15 | 0.212 | 40.0 | 6.4 | 46.4 |

*Values taken from Rev. Mod. Phys. 24 (1952) 28.

MEASURED VALUES

Voltage at breaking point of intensity ratio curve, kv.:    Measured thickness, mils
(1) 27 ---------------------------------- 0.05
(2) 37 ---------------------------------- 0.10
(3) 43 ---------------------------------- 0.135

It can be seen from FIGURE 3 that thickness measurements are feasible up to the centimeter range. The necessary electron energy can readily be obtained, e.g. from a Van de Graff generator.

Hereinbefore I have described my invention specifically in connection with the generation of characteristic X-rays by the integument alone or by both the integument and the base, and I have shown how the energy of the electron beam required for integument penetration can be determined by observing either the intensity changes of characteristic X-rays of the integument or changes in the ratio of the intensities of characteristic X-rays of the base and integument and by measuring the electron beam energy where irregularities occur in these observations. It should be noted that there are other ways of determining the energy of the electron beam at which complete penetration of the integument occurs which do not depend on the production of characteristic X-rays of either the base or the integument, and hence any suitable method of determining the energy of the electron beam at which complete penetration of the integument occurs may be utilized without departing from my invention.

It is not essential that characteristic X-rays be observed, for example, as my method will operate satisfactorily by observing characteristic electromagnetic radiation generally.

The energy of the electron beam at which complete penetration of the integument occurs can be determined by directing an electron beam at the integument with insufficient energy to cause penetration of the integument, increasing the energy of the beam and by measuring the energy of the electron beam at the time when the sudden appearance of characteristic electromagnetic radiation of the base is observed. This characteristic electromagnetic radiation may be a characteristic X-ray and must be derivable with higher yield from the base material than from the integument. The energy of the electron beam to cause penetration of the integument is the measured energy less the energy required to excite the characteristic electromagnetic radiation. If either the base or the integument permit light to pass therethrough, the energy of the electron beam to completely penetrate the integument can be determined by observing the onset of fluorescence or visible or ultraviolet light from the base as soon as the electrons have sufficient energy to reach the base and excite this light. Again the energy of the electron beam required to penetrate the integument is the measured energy of the electron beam at the appearance of the light less the energy required to excite the light. As aforementioned, either the base or the integument must permit the light to pass therethrough so that it can be observed. If the integument will permit the light to pass therethrough, the light observing instrument will be placed on the integument side of the base and integument as shown in FIGURE 4, but if only the base will permit the light to pass therethrough, the light observing device will have to be positioned on the base side and the observation made from underneath the integument and base. If both base and integument will permit light to pass therethrough, the observation can be made on either side.

If at least one of the base and integument are adapted to permit light to pass therethrough, the two methods embodying my invention previously described in detail can be employed by observing characteristic light rather than characteristic X-rays.

It can be seen from the foregoing that it would not depart from my invention to use different methods for determining the energy of the electron beam required for complete penetration of the integument.

It will be noted that the embodiment of my invention which relies on measuring the electron beam energy at the point where characteristic electromagnetic radiation of the base suddenly appears is especially useful for measuring the thickness of an integument on a base material where the base material is an alloy, one constituent of which is the same as the integument. Under such circumstances, characteristic electromagnetic radiation from a constituent of the base not present in the integument should be observed.

Figure 6:
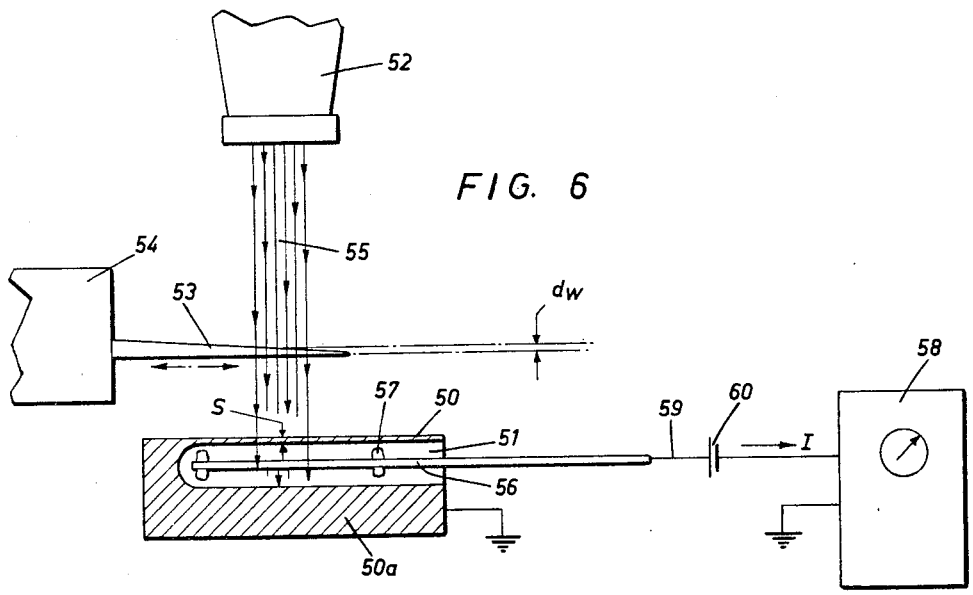

Referring now to FIGURE 6, I have shown one form of apparatus which may be used to measure the thickness S of the wall 50 of a cavity 51 in a block 50a of material. This apparatus consists of an electron generator 52, a tapered wedge 53 of a material such as aluminum, for example, any suitable means 54 for moving wedge 53 laterally across the electron beam 55 from electron generator 52, a current pick-up wire 56 positioned in cavity 51 and electrically insulated from block 50a by electrical insulators such as glass beads 57, for example, a combination electrometer, amplifier and meter 58, a battery 60 for biasing pick-up wire 56 positively, and a conductor 59 connecting the pick-up wire, battery 60 and instrument 58. The instrument 58 is grounded as shown, as is block 50a.

Figure 7:
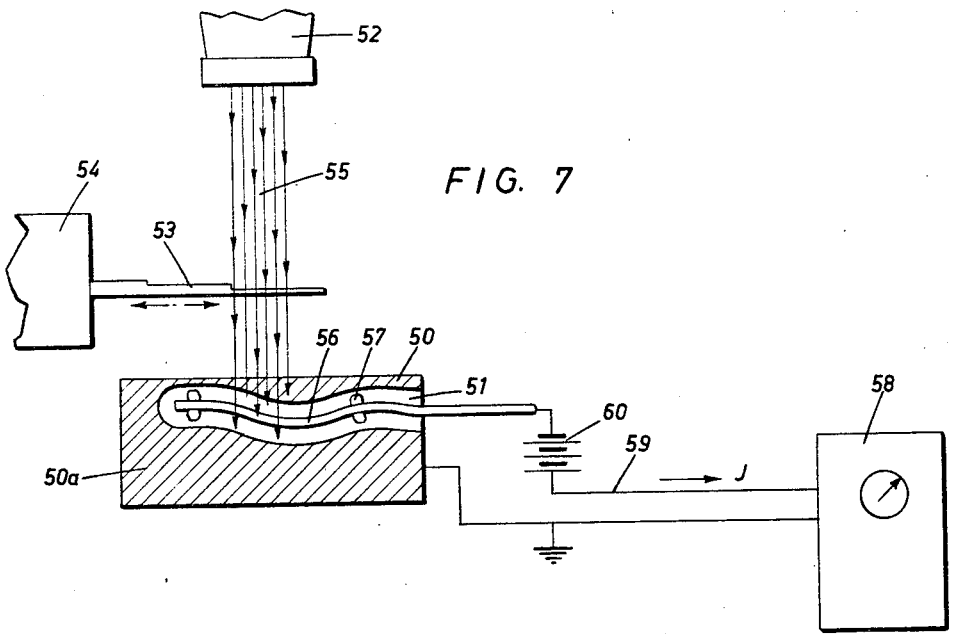

The apparatus of FIGURE 7 is the same as that of FIGURE 6 execept that wedge 53 is stepped in known increments of thickness and battery 60 is connected to pick-up wire 56 in such a manner as to bias pick-up wire 56 negatively.

Figure 8:
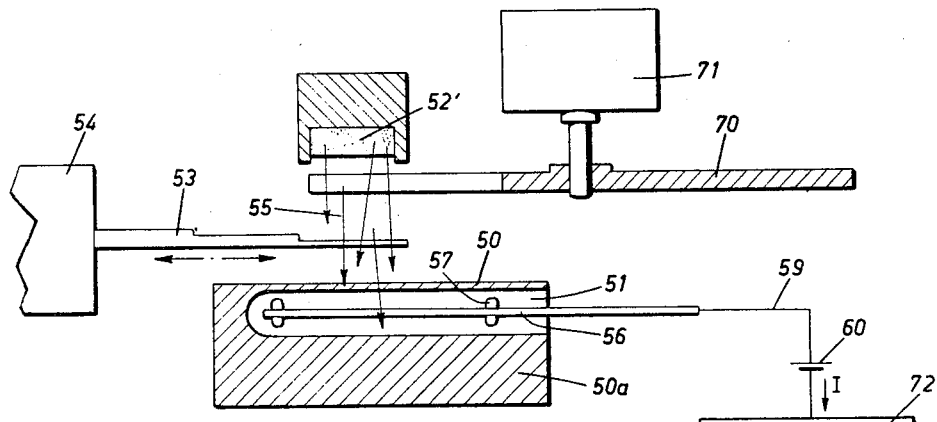

In FIGURE 8 an isotope source 52′ using Kr–85 or Sr-Y–90, for example, is employed in place of electron generator 52. In addition, a chopper wheel 70 driven by a chopper motor 71 is provided, the chopper wheel being rotatable in the beta radiation 55 (electron) from isotope source 52′. The pick-up wire 56 is connected to an AC amplifier 72 which is in phase with the chopper and tuned to the chopper frequency. Amplifier 72 is connected to a meter 73. While battery 60 is shown as being connected to bias pick-up wire 56 positively so that electron current I will be detected by meter 73, the battery 60 could be reversed so that ion current J will be detected, as in the case of the apparatus of FIGURE 7.

Figure 9:
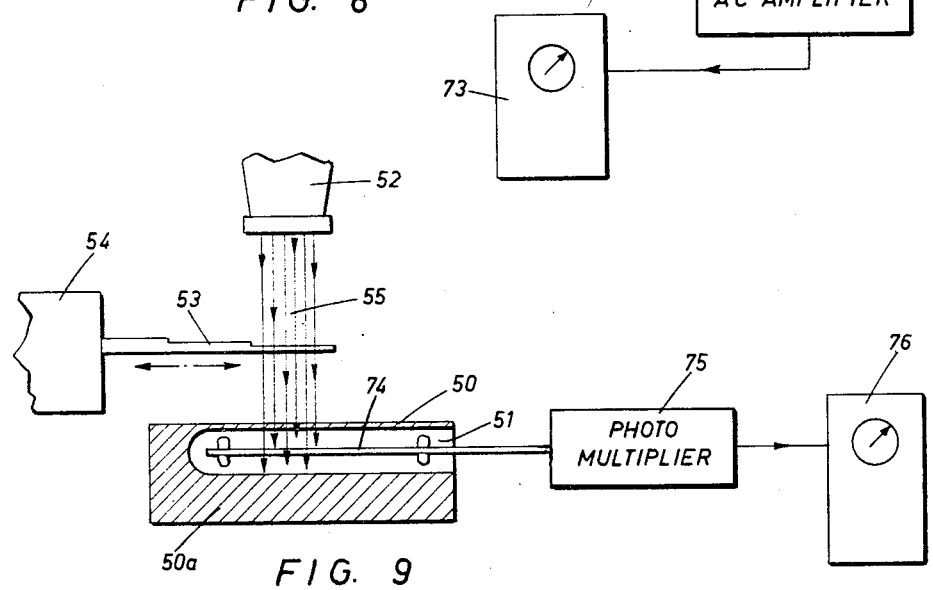

The apparatus of FIGURE 9 differs from that shown in FIGURE 7 by embodying a flexible glass or plastic rod 74 which fluoresces under bombardment by electrons, rod 74 being connected to a photomultiplier 75 which is electrically connected to a meter 76.

The utilization of a movable wedge 53 makes it possible to employ an electron generator or source which need not necessarily be capable of producing an electron beam of controlled, variable energy. Thus it is possible to employ an electron generator of fixed, stabilized voltage and current, such as a Van de Graaff generator with accelerator tube, or to employ a radioactive isotope source. Such a system consisting of a movable wedge and an electron generator of fixed, stabilized voltage and current or an electron source such as a radioactive isotope also may be used in place of the electron gun of FIGURE 1. It will be appreciated, of course, that wedge 53 permits the energy of electron beam 55 to be modulated. Of course, if desired an electron gun or other source capable of producing an electron beam of controlled, variable energy can be employed in place of generator 52 or source 52′ thus eliminating the need for wedge 53.

In order to measure the thickness of wall 50 using the apparatus of FIGURE 6, wedge 53 is withdrawn from electron bean 55 until a sudden onset of electron current I is indicated by instrument 58. This onset of electron current is due to electrons in beam 55 penetrating wall 50 and being collected by positively biased pick-up wire 56. When this sudden onset of electron current is detected by instrument 58, the thickness $dw$ of the part of wedge 53 on which the electron beam is incident is measured. The energy $Eo$ of electron beam 55 required to penetrate wedge 53 and wall 50 is known. Therefore, by reference to the lower graph in FIGURE 3, the range of electrons corresponding to this energy can be obtained, and the thickness of wall 50 is obtained by deducting the value for the range of electrons in the known thickness of wedge 53 from the range number previously obtained from FIGURE 3. The value which is thus obtained can be converted to wall thickness in linear units using the upper graph of FIGURE 3. This method therefore is based upon the following equations:

$$I=0 \text{ for } dw+S>R(Eo)$$
$$I>0 \text{ for } dw+S<R(Eo)$$

where $R(Eo)$ is the range of electrons of energy $Eo$, $I$, $dw$, and $R(Eo)$ are known, of course, and since $dw$ is a variable, $S$ can be determined from the value of $dw$ at which $I$ becomes greater than zero.

Essentially the same method is carried out using the apparatus of FIGURE 7, except, that the thickness $dw$ of wedge 53 is determined at the onset of ionization current $J$ due to electron penetration of wall 50, rather than electron current $I$, as in the case of FIGURE 6. In this connection it will be appreciated that $I$ is a weak current but the high energy electrons which penetrate wall 50 and enter cavity 51 produce considerable ionization in the air in cavity 51, and the resultant ionization current $J$ can be detected more readily than the electron current $I$ by simply biasing pick-up wire 56 a few volts negative by battery 60. It is important to note that prior to penetration of electrons into cavity 51, there will be some ionization current detected due to X-rays produced in wall 50 by electron bombardment. However, electron penetration into cavity 51 will be accompanied by a sharp increase in ionization current, and it is the value of $dw$ at the onset of ionization current due to electron penetration which must be used.

The stepping of wedge 53 in known increments of thickness avoids the necessity of having to measure $dw$.

The same methods as referred to hereinbefore in connection with FIGURES 6 and 7 may be carried out using the apparatus of FIGURE 8. Isotopes such as Kr–85 and Sr-Y–90 do not provide a monoenergetic electron beam, but the electrons emitted from such sources have a well defined upped energy limit, and therefore a well defined maximum range. This maximum energy part of the beam can be used for thickness gauging on the basis of the range energy law using the wedge 53 of FIGURE 8 to modify the maximum energy of the beam. A megnetic separator may be employed in conjunction with the isotope source 52′ to separate out other than the maximum energy electrons, if advantageous.

In view of the fact that the number of electrons per second emitted from an isotope source gives rise to only an extremely weak current, as compared to that which will be obtained using an electron generator, it is advisable to employ AC rather than DC methods of detecting electron or ionization current when using an isotope source. By chopping electron beam 55 with chopper wheel 70, the current $I$ or $J$ picked-up by wire 56 will be modulated and can be amplified readily by amplifier 72 and detected by meter 73, so that the onset of electron current or ionization current due to electron penetration of wall 50 can be observed readily.

In FIGURE 9 the thickness of wedge 53 for which electrons penetrate wall 50 is determined at the point when the electrons commence to cause fluorescence in rod 74. When this occurs, a pulse from photomultiplier 75 is indicated on meter 76. As an alternative to employing a rod 74, and where cavity 51 is reasonably straight, the onset of electron penetration into the cavity may be determined from fluorescence produced in the air of the cavity, or the cavity may be filled with a gas giving a higher fluorescence yield, e.g. argon. Cavity 51 also could be filled with a liquid adapted to fluoresce under electron bombardment, such as the liquid commonly used in liquid scintillation counters.

It will be appreciated that the thickness of sheet materials can be measured using the aforementioned methods if a cup having an open end and one open side and containing the current pick-up wire or light sensor is pressed with its open side against the sheet to form an artificial cavity.

It will be seen from the foregoing that it is characteristic of the methods illustrated in connection with FIGURES 6 to 9 to determine, by detecting the onset of electron current, ionization current of fluorescence, when electron penetration of wall 50 has just taken place. If a source of electrons of fixed energy is employed together with a wedge, the thickness of the wedge for electron penetration of wall 50 is obtained, the total range for electrons of the known energy is obtained from the lower graph in FIGURE 3, and the range of electrons in the known thickness of the wedge is deducted therefrom to provide a result indicative of the thickness of wall 50 in gm./cm.$^2$ which may be converted to linear thickness using the curve shown in the upper graph of FIGURE 3.

In the event that an electron gun capable of delivering a beam of electrons having controlled variable energy is employed in place of the combination of generator 52 or isotope source 52' and wedge 53, the energy of the electron beam required for penetration of wall 50 is determined at the onset of fluorescence, electron current or ionization current due to electron penetration, and the thickness of wall 50 is obtained directly from the range-energy curve of FIGURE 3 in the same manner as previously explained in connection with measuring the thickness of integuments on a base material.

The methods hereinbefore described in connection with FIGURES 6–9 are particularly satisfactory for measuring the thickness of the walls of small cavities or tubes. Absorption methods are not practical for such applications because the bulky detector required in practising such methods cannot be inserted in small tubes or cavities. The methods described in connection with FIGURES 6–8 can be used regardless of whether the walls of the cavity are curved or not, since pick-up wire 56, being flexible, will bend if inserted in a curved cavity.

While I have described preferred embodiments of my invention, various changes and modifications may be made therein without departing from the spirit and scope of my invention as defined in the appended claims.

What I claim as my invention is:

1. A method for determining the thickness of an integument on a base material utilizing the known relationship between range and energy of electrons passing through matter, said integument and said base material having different chemical compositions, which comprises: directing an electron beam at said integument, varying the kinetic energy of said electron beam, detecting the penetration of said integument by said electron beam to derive an indication of the kinetic energy of said electron beam at which complete penetration of said integument occurs, and obtaining the thickness of said integument by relating the kinetic energy of said electron beam at which complete penetration of said integument occurs to the range-energy curve of electrons passing through matter.

2. A method according to claim 1 wherein complete penetration of said integument is detected by observing the intensity changes of characteristic electromagnetic radiation of said integument caused by said electron beam, the curve relating the intensity of said electromagnetic radiation to the kinetic energy of said electron beam exhibiting an irregularity at the point of complete penetration of said integument by said electron beam, and wherein the kinetic energy of said electron beam at which complete penetration of said integument occurs is determined by measuring the kinetic energy of said electron beam at said point, as between said integument and said base material and under the influence of said electron beam said characteristic electromagnetic radiation being derivable with higher yield from said integument than from said base material.

3. A method according to claim 2 wherein said characteristic electromagnetic radiation is derivable from only said integument.

4. A method according to claim 2 wherein said characteristic electromagnetic radiation of said integument is a characteristic X-ray of said integument.

5. A method according to claim 2 wherein said characteristic electromagnetic radiation of said integument is light and at least one of said integument and said base permits said light to pass therethrough.

6. A method according to claim 1 wherein complete penetration of said integument is detected by observing the sudden appearance of characteristic electromagnetic radiation of said base material caused by said electron beam, and wherein the kinetic energy of said electron beam at which complete penetration of said integument occurs is determined by measuring the kinetic energy of said electron beam at said sudden appearance and deducting therefrom the excitation energy of said characteristic electromagnetic radiation, as between said integument and said base material and under the influence of said electron beam said characteristic electromagnetic radiation being derivable with higher yield from said base material than from said integument.

7. A method according to claim 6 wherein said characteristic electromagnetic radiation is derivable from only said base material.

8. A method according to claim 6 wherein said characteristic electromagnetic radiation of said base material is a characteristic X-ray of said base material.

9. A method according to claim 6 wherein said characteristic electromagnetic radiation of said base material is light and at least one of said integument and said base material permits said light to pass therethrough.

10. A method for determining the thickness of an integument on a base material utilizing the known relationship between range and energy of electrons passing through matter, said integument and said base material having different chemical compositions which comprises: directing an electron beam at said integument, varying the kinetic energy of said electron beam, determining the kinetic energy of said electron beam at which complete penetration of said integument occurs by (a) observing changes in the ratio of the intensities of characteristic electromagnetic radiation of said base material and characteristic electromagnetic radiation of said integument, said characteristic electromagnetic radiations being distinguishable from each other, as between said integument and said base material and under the influence of said electron beam said characteristic electromagnetic radiation of said base material being derivable with higher yield from said base material than from said integument and said characteristic electromagnetic radiation from said integument being derivable with higher yield from said integument than from said base material, the curve relating said ratio to said kinetic energy of said electron beam exhibiting an irregularity at the point of complete penetration of said integument by said electron beam, (b) measuring the kinetic energy of said electron beam at said point, and (c) deducting the excitation energy of said characteristic electromagnetic radiation of said base material from the measured kinetic energy of said electron beam at said point, and obtaining the thickness of said integument by relating the kinetic energy of said electron beam at which complete penetration of said integument occurs to the range-energy curve of electrons passing through matter.

11. A method according to claim 10 wherein said characteristic electromagnetic radiation of said base material is derivable from only said base material and said characteristic electromagnetic radiation of said integument is derivable from only said integument.

12. A method according to claim 10 wherein said characteristic electromagnetic radiations of said base material and said integument are characteristic X-rays of said base material and said integument respectively.

13. A method according to claim 10 wherein said characteristic electromagnetic radiations of said base material and said integument are light and at least one of said integument and said base material permits said light to pass therethrough.

14. A method for determining the thickness of an object using the known relationship between range and energy of electrons passing through matter which comprises; directing an electron beam at said object, varying the kinetic energy of said electron beam, detecting the penetration of said material by said electron beam, measuring the kinetic energy of said electron beam at which complete penetration of said object just occurs, and obtaining the thickness of said material by relating the kinetic energy of said electron beam at which complete penetration of said object occurs to the range-energy curve of electrons passing through matter.

15. A method according to claim 14 wherein the penetration of said object by said electron beam is detected by collecting electrons passed through said object and by observing the onset of an electron current caused by collected electrons which have penetrated said object.

16. A method according to claim 14 wherein the penetration of said object is detected by observing the onset by collecting ions created by electrons passed through said object and by observing the onset of an ionization current caused by collected ions which have been created by electrons which have penetrated said object.

17. A method according to claim 14 wherein the penetration of said object is detected by observing the onset of fluorescence caused by electrons which have penetrated said object.

18. A method for determining the thickness of an object using the known relationship between range and energy of electrons passing through matter which comprises; directing an electron beam of predetermined energy through an electron absorptive wedge of varying thickness and at said object, varying the kinetic energy of said electron beam by moving said wedge to alter the thickness thereof through which said electron beam passes, detecting the penetration of said object by said electron beam to derive an indication of the thickness of the part of said wedge through which said electron beam is passing at the point when complete penetration of said object just occurs, and obtaining the thickness of said object by obtaining the range of said electrons for an electron beam of said predetermined energy from the range-energy curve of electrons passing through matter and by deducting therefrom the range of electrons in said part of said wedge.

19. A method for determining the thickness of the wall of a cavity using the known relationship between range and energy of electrons passing through matter which comprises; directing an electron beam of predetermined energy through an electron absorptive wedge of varying thickness and at said wall, varying the kinetic energy of said electron beam by moving said wedge to alter the thickness thereof through which said electron beam passes, detecting the penetration of said wall by said electron beam to derive an indication of the thickness of the part of said wedge through which said electron beam is passing at the point when complete penetration of said wall just occurs, and obtaining the thickness of said wall by obtaining the range of said electrons for an electron beam of said predetermined energy from the range-energy curve of electrons passing through matter and by deducting therefrom the range of electrons in said part of said wedge.

20. A method according to claim 19 wherein the penetration of said wall by said electron beam is detected by collecting electrons passed through said wall into said cavity and by observing the onset of an electron current caused by electrons collected in said cavity and which have penetrated said wall.

21. A method according to claim 19 wherein the penetration of said wall by said electron beam is detected by collecting ions in said cavity created by electrons passed through said wall and by observing the onset of an ionization current caused by ions collected in said cavity and which have been created by electrons which have penetrated said wall.

22. A method according to claim 19 wherein the penetration of said wall by said electron beam is detected by observing the onset of fluorescence in said cavity caused by electrons which have penetrated said wall.

23. A method according to claim 19 wherein the penetration of said wall by said electron beam is detected by observing the onset of fluorescence in a flexible rod of fluorescent material positioned in said cavity.

24. A method according to claim 20 wherein said electrons are collected on a flexible electrical conductor positioned in said cavity.

25. A method according to claim 21 wherein said ions are collected on a flexible electrical conductor positioned in said cavity.

26. A method according to claim 2 wherein the kinetic energy of said electron beam is initially of a magnitude at which said integument emits said characteristic electromagnetic radiation in response to said electron beam, but is not completely penetrated by said electron beam,
and the kinetic energy of said electron beam is varied by increasing its magnitude to effect complete penetration of said integument by said electron beam.

27. A method according to claim 6 wherein the kinetic energy of said electron beam is initially of a magnitude at which said integument is not completely penetrated by said electron beam,
and the kinetic energy of said electron beam is varied by increasing its magnitude to effect complete penetration of said integument by said electron beam and emission of said characteristic electromagnetic radiation by said base in response to said electron beam.

28. A method according to claim 10 wherein the kinetic energy of said electron beam is initially of a magnitude at which said integument emits said characteristic electromagnetic radiation in response to said electron beam, but is not completely penetrated thereby,
and the kinetic energy of said electron beam is varied by increasing its magnitude to effect complete penetration of said integument by said electron beam and emission of said characteristic electromagnetic radiation by said base in response to said electron beam.

References Cited

UNITED STATES PATENTS

| | | | |
|---|---|---|---|
| 2,467,812 | 4/1949 | Clapp | 250—83.3 |
| 2,939,012 | 5/1960 | Scherbatskoy | 250—83.3 X |
| 3,103,584 | 9/1963 | Shapiro et al. | 250—51.5 X |
| 3,146,347 | 8/1964 | Ziegler | 250—83.3 X |

ARCHIE R. BORCHELT, *Primary Examiner.*